United States Patent
Zhang (10) Patent No.: US 11,769,314 B2
(45) Date of Patent: Sep. 26, 2023

(54) DISPLAY METHOD AND ELECTRONIC DEVICE

(71) Applicant: ViVO MOBILE COMMUNICATION CO., LTD., Guangdong (CN)

(72) Inventor: Hanyu Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/720,043

(22) Filed: Apr. 13, 2022

(65) Prior Publication Data

US 2022/0284686 A1    Sep. 8, 2022

Related U.S. Application Data

(63) Continuation of application No. PCT/CN2020/123322, filed on Oct. 23, 2020.

(30) Foreign Application Priority Data

Oct. 24, 2019  (CN) .......................... 201911019848.8

(51) Int. Cl.
  *G06V 10/143*  (2022.01)
  *G06V 40/13*   (2022.01)
  *G06V 40/60*   (2022.01)
  *G06V 40/12*   (2022.01)

(52) U.S. Cl.
  CPC ........ *G06V 10/143* (2022.01); *G06V 40/1318* (2022.01); *G06V 40/1394* (2022.01); *G06V 40/67* (2022.01)

(58) Field of Classification Search
  CPC ............. G06V 10/143; G06V 40/1318; G06V 40/1394; G06V 40/67; G06V 40/12; G06V 40/1324; G06V 40/1382
  See application file for complete search history.

(56) References Cited

U.S. PATENT DOCUMENTS

| | | | |
|---|---|---|---|
| 2019/0102594 A1 | 4/2019 | Peng | |
| 2020/0110919 A1 | 4/2020 | Qiu et al. | |
| 2021/0012080 A1 | 1/2021 | Fan | |

FOREIGN PATENT DOCUMENTS

| | | |
|---|---|---|
| CN | 107172278 A | 9/2017 |
| CN | 107832689 A | 3/2018 |
| CN | 108229372 A | 6/2018 |

(Continued)

OTHER PUBLICATIONS

Extended European Search Report for Application No. 20879139.2, dated Nov. 11, 2022, 9 Pages.

(Continued)

*Primary Examiner* — Abhishek Sarma
(74) *Attorney, Agent, or Firm* — BROOKS KUSHMAN P.C.

(57) ABSTRACT

A display method, an electronic device, and a computer-readable storage medium are provided. The method includes: determining a current application scenario in a case that an input of triggering display of a fingerprint icon is received; determining a target light spot based on a target parameter of the application scenario, where target light spots corresponding to different target parameters have different proportions of a red light component, different proportions of a green light component, and different proportions of a blue light component; and displaying a fingerprint icon formed by the target light spot.

20 Claims, 6 Drawing Sheets

(56) References Cited

FOREIGN PATENT DOCUMENTS

| | | |
|---|---|---|
| CN | 108596124 A | 9/2018 |
| CN | 108763906 A | 11/2018 |
| CN | 108804956 A | 11/2018 |
| CN | 109416740 A | 3/2019 |
| CN | 110059627 A | 7/2019 |
| CN | 110096865 A | 8/2019 |
| CN | 110197159 A | 9/2019 |
| CN | 110826438 A | 2/2020 |

OTHER PUBLICATIONS

First Office Action for Chinese Application No. 201911019848.8, dated Jan. 6, 2022, 6 Pages.
Second Office Action for Chinese Application No. 201911019848.8, dated Aug. 3, 2022, 7 Pages.
International Search Report and Written Opinion for Application No. PCT/CN2020/123322, dated Jan. 26, 2021, 10 Pages.

DISPLAY METHOD AND ELECTRONIC DEVICE

CROSS-REFERENCE TO RELATED APPLICATIONS

This application is a continuation application of PCT International Application No. PCT/CN2020/123322 filed on Oct. 23, 2020, which claims priority to Chinese Patent Application No. 201911019848.8, filed on Oct. 24, 2019, which are incorporated herein by reference in their entireties.

TECHNICAL FIELD

This application relates to the field of terminal display, and in particular, to a display method and an electronic device.

BACKGROUND

In the interactive unlock scheme of electronic devices, the biometrics recognition technology has become an emerging interactive technology, of which the optical fingerprint recognition technology has become a very convenient and quick fingerprint recognition scheme. The optical fingerprint recognition technology adopts an under-display hidden fingerprint design under the screen, enabling screen unlock by directly pressing a fingerprint icon region shown on the screen with a finger.

In the related art, when being pressed by a finger, a fingerprint icon region on a screen is lit up to the brightest level that can be supported by the screen, that is, HBM (High Bright Mode, high brightness mode) is enabled. After a fingerprint recognition result is returned, the system disables HBM and goes back to normal brightness. In HBM, organic materials in the screen are depleted quickly, which causes screen brightness in the fingerprint icon region to decrease and results in sticking image, further reducing reliability of the screen and affecting screen service life. However, in HBM, the screen is bright, helping improve definition of a fingerprint image collected by a fingerprint sensor and improve recognition rate of the fingerprint image.

Furthermore, the optical fingerprint recognition technology uses red light for anti-counterfeiting, rays of light emitted by an organic emitting diode form a fingerprint icon, and red light included therein may be used to recognize counterfeit or reproduced fingerprint information. More red light provides a better anti-counterfeiting effect. However, in a light environment, red light contained in the ambient light can also be received and imaged by the fingerprint sensor, which reduces imaging accuracy of the fingerprint sensor, makes it difficult for the user's fingerprint to be recognized, and decreases the fingerprint recognition rate.

The foregoing facts show that existing fingerprint icon display technologies have problems of shortened screen service life and decreased fingerprint recognition rate.

SUMMARY

This application provides a display method and an electronic device.

According to a first aspect, an embodiment of this disclosure provides a display method, applied to an electronic device, where the method includes:

determining a current application scenario in a case that an input of triggering display of a fingerprint icon is received;

determining a target light spot based on a target parameter of the application scenario, where target light spots corresponding to different target parameters have different proportions for a red light component, a green light component and a blue light component, and the red light component, the green light component, and the blue light component are a brightness value of red light, a brightness value of blue light, and a brightness value of green light, respectively; and displaying a fingerprint icon formed by the target light spot.

According to a second aspect, an embodiment of this application provides an electronic device, where the electronic device includes:

an application scenario determining module, configured to determine a current application scenario in a case that an input of triggering display of a fingerprint icon is received;

a target light spot determining module, configured to determine a target light spot based on a target parameter of the application scenario, where target light spots corresponding to different target parameters have different proportions for a red light component, a green light component and a blue light component, and the red light component, the green light component, and the blue light component are a brightness value of red light, a brightness value of blue light, and a brightness value of green light, respectively; and a display module, configured to display a fingerprint icon formed by the target light spot.

According to a third aspect, an embodiment of this disclosure provides a mobile terminal, including a processor, a memory, and a computer program stored in the memory and capable of running on the processor, where when the computer program is executed by the processor, the steps of the display method according to the first aspect are implemented.

According to a fourth aspect, an embodiment of this disclosure provides a computer-readable storage medium, where the computer-readable storage medium stores a computer program, and when the computer program is executed by a processor, the steps of the display method according to the first aspect are implemented.

According to a fifth aspect, an embodiment of this disclosure provides a display apparatus, where the display apparatus is configured to perform the steps of the display method according to the first aspect.

In the embodiments of this application, a current application scenario is determined in a case that an input of triggering display of a fingerprint icon is received; a target light spot is determined based on a target parameter of the application scenario, where target light spots corresponding to different target parameters have different proportions for a red light component, a green light component and a blue light component; and a fingerprint icon formed by the target light spot is displayed. In the method, target light spots corresponding to different target parameters can have a red light component, a green light component and a blue light component that may be different from one another, in other words, can correspond to different brightness values of red light, brightness values of blue light, and brightness values of green light.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from these accompanying drawings without creative efforts.

DETAILED DESCRIPTION

The following clearly describes the technical solutions in the embodiments of this application with reference to the accompanying drawings in the embodiments of this application. Apparently, the described embodiments are only a part rather than all of the embodiments of this application. All other embodiments obtained by a person of ordinary skill in the art based on the embodiments of this application without creative efforts shall fall within the protection scope of this application.

Figure 1:
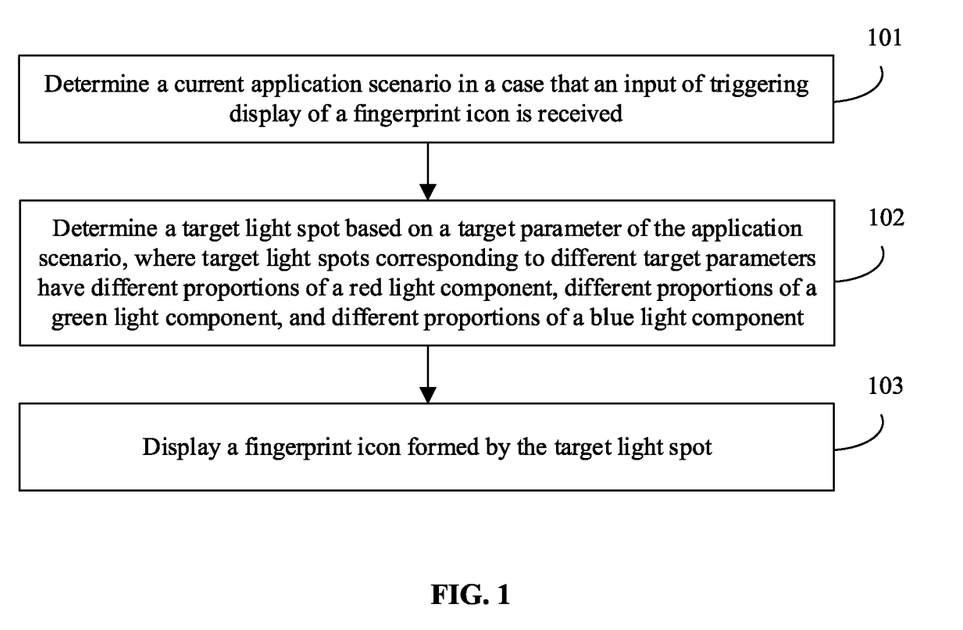
FIG. 1 is a first flowchart of a display method according to an embodiment of this application.

FIG. 1 is a first flowchart of a display method according to an embodiment of this application. The method is applied to an electronic device. The electronic device described in this embodiment of this application may include a mobile terminal such as a mobile phone, a tablet computer, a notebook computer, a palmtop computer, a personal digital assistant (PDA), a portable media player (PMP), a navigation apparatus, a wearable device, a smart band, and a pedometer, and a fixed terminal such as a digital TV and a desktop computer.

The display method may specifically include the following steps.

Step 101. Determine a current application scenario in a case that an input of triggering display of a fingerprint icon is received.

Existing optical fingerprint recognition technology uses a photoelectric reflection technology to realize fingerprint recognition, and an electronic device specially configured with an OLED (Organic Light-Emitting Diode) screen realizes optical fingerprint recognition in such way: The light emitted by an organic light-emitting diode in the OLED screen of the electronic device causes a fingerprint icon region on the screen of the electronic device to automatically light up to display a fingerprint icon. When a user presses the fingerprint icon region with a finger, the light emitted by the organic light-emitting diode is reflected by the fingerprint of the finger, and the light passes through an optical fingerprint sensor, and forms a fingerprint image on a chip. The fingerprint image is matched with a preset fingerprint image, and if the match is successful, the recognition is successful.

The organic light-emitting diode in the fingerprint icon region of the OLED screen emits light, causing the fingerprint icon region to light up to a brightest level that the screen can support, that is, HBM (High Bright Mode, high brightness mode). After a fingerprint recognition result is returned, the system disables HBM so that the fingerprint icon region goes back to normal brightness. The light emitted by the light-emitting diode in the OLED screen is composed of light of three primary colors: red, green, and blue, and a variety of colors can be obtained by adjusting brightness values of the three color channels of red light, green light, and blue light and superimposing them with each other. To light up the fingerprint icon region to HBM, it is necessary to use the three primary colors to synthesize white light. On the one hand, synthesizing white light requires more blue light. However, blue light depletes the organic light-emitting materials most quickly and red light and green light deplete fewer organic light-emitting materials, resulting in different degrees of depletion of the organic light-emitting materials of the screen in the fingerprint icon display region. On the other hand, in order to improve definition of a fingerprint image collected by the fingerprint sensor and increase fingerprint recognition rate, white light is needed to increase brightness of the fingerprint icon region, which causes currents passing through the fingerprint icon region of the screen to increase, leading to accelerated depletion of organic light-emitting materials of the screen in the fingerprint icon region, and further accelerating screen aging. These two aspects cause a phenomenon of sticking image, which is presented as screen brightness decrease in the fingerprint icon region from the user's perspective. Therefore, to minimize the phenomenon of sticking image, the screen brightness and the blue light component in the light emitted by the organic light-emitting diode of the screen in the fingerprint icon region need to be reduced moderately.

However, the blue light component and the green light component affect the fingerprint recognition rate. The reasons are as follows: when the light emitted by the organic light-emitting diode is reflected by the fingerprint of the finger, the light passes through an optical fingerprint sensor, and forms a fingerprint image on a chip. If the brightness of the emitted light is greater, the effect of the light being reflected by the fingerprint is more obvious, and the fingerprint image formed on the chip is clearer, and a clear fingerprint image can improve the accuracy of matching with the preset fingerprint image, so as to increase the fingerprint recognition rate. The brightness of the light is greater when the color of the light is closer to white, and more blue light components and green light components are required to synthesize white light. Moreover, the green light is also used to image the fingerprint on the chip.

In the related art, the optical fingerprint recognition technology relies on red light for anti-counterfeiting recognition. The principle is as follows: The penetration rate of red light into human skin is high. When the red light in the light emitted from the organic light-emitting diode passes through a finger, differences in blood flow formed in the vasodilation process of blood vessels in the finger result in changes in reflected energy of the red light. However, a replicated non-living fingerprint has no biological characteristics of human skin and blood vessels, so the reflected energy of the red light is fixed. Therefore, an infrared receiving sensor built in the electronic device can be used to receive different reflected energy generated by the skin and the fingerprint that are exposed to red light, and use this to detect whether the fingerprint is a living fingerprint, so as to achieve the purpose of anti-counterfeiting. Moreover, more red light in the light bring better anti-counterfeiting effect and higher security.

However, in a light environment, because ambient light also contains a large amount of red light components, and the red light components in the ambient light can also be received by the optical fingerprint sensor, interference is caused to the imaging of the light that is emitted by the organic light-emitting diode and normally reflected by the fingerprint, reducing accuracy of fingerprint detection by the fingerprint sensor. Therefore, red light in the light emitted by the organic light-emitting diode can affect the fingerprint recognition rate. To guarantee the fingerprint recognition rate, a light filter in the fingerprint sensor can be used to filter out red light, and only blue light and green light are received. However, if fingerprint anti-counterfeiting performance is also taken into account, red light must be used. Therefore in different application scenarios, a proportion of the red light component in the light needs to be appropriate.

The light emitted by the organic light-emitting diode is projected on the fingerprint icon region of the screen to form a fingerprint light spot, and a color of the fingerprint light spot is determined based on proportions of the red light, green light, and blue light in the light emitted by the organic light-emitting diode.

Therefore, to resolve the problems of shortened screen service life and decreased fingerprint recognition rate in existing optical fingerprint recognition technologies, a fingerprint light spot with a color suitable for a specific application scenario can be used to minimize phenomena of sticking image and screen aging, prolong the screen service life, and increase the fingerprint recognition rate.

In this embodiment of this application, a current application scenario is determined in a case that an input of triggering display of a fingerprint icon is received. The determined application scenario of target parameters in a fingerprint icon may include a scenario of electronic device screen unlock, a scenario of identity authentication upon software or website login, a scenario of identity authentication upon private file encryption and decryption, and a scenario of actions such as paying or transferring money via online banking, and the like. Therefore, an input of triggering display of the fingerprint icon may include an input of triggering unlocking of the electronic device screen. For example, after the user presses the screen-on button on a side of the electronic device, the fingerprint icon is displayed on the screen to prompt the user to use fingerprint recognition to unlock the screen. Therefore, pressing the screen-on button on the side of the electronic device is an input of triggering display of the fingerprint icon. An input of triggering display of the fingerprint icon may further include an input of triggering identity authentication when the user logs in to a website or software. For example, after the user opens a target website or software and taps the login button on the home page, the fingerprint icon used to authenticate user identity is displayed to prompt the user to log in by fingerprint recognition. Therefore, tapping the login button is an input of triggering display of the fingerprint icon.

After the fingerprint icon for fingerprint recognition is displayed, the user presses the fingerprint icon region with a finger, and in this case, the fingerprint icon region of the electronic device receives a target fingerprint, and compares the target fingerprint with a preset fingerprint to perform fingerprint recognition. To resolve the problems in existing fingerprint icon display technologies, the electronic device can determine a current application scenario for an input of triggering display of the fingerprint icon.

As described above, generally, the application scenario for an input of triggering display fingerprint icon may include: a scenario of electronic device screen unlock, a scenario of identity authentication upon software or website login, a scenario of identity authentication upon private file encryption and decryption, and a scenario of actions such as paying or transferring money via online banking, and the like.

Optionally, the determining a current application scenario includes the following step A1 and step A2.

Step A1: Determine an application program and/or an application program interface that receives the input of triggering display of a fingerprint icon.

In this embodiment of this application, to determine the current application scenario, detection may be performed for the application program and/or the application program interface that receives the input of triggering display of a fingerprint icon.

Step A2: Determine the current application scenario based on the application program and/or characteristic data in the application program interface.

In this embodiment of this application, if the determined application program is an application program with a single function, the current application scenario can be determined directly based on the application program. For example, if the determined application program is an application program of locking system screen, the current application scenario is determined to be a scenario of electronic device screen unlock; and if the determined application program is an application program of encrypting and decrypting files, then the current application scenario is determined to be a scenario of identity authentication upon private file encryption and decryption.

If the determined application program is an application program with a variety of functions, the current application scenario is determined based on characteristic data of the application program interface. Specifically, the characteristic data in the application program interface can be extracted, and the characteristic data includes at least text and image, for example, text and image in an input region that receives user input, and the current application scenario can be determined based on the text and image. For example, if the determined application is Alipay and the extracted characteristic data on the interface includes text such as "Please input your fingerprint password" and "confirm and pay", the current application scenario is determined to be a scenario of an action such as paying or transferring money via Alipay. If the determined application is Alipay and the extracted characteristic data on the interface includes text such as "Alipay account" and "login password" and an authentication picture used for login, the current application scenario is determined to be a scenario of login to Alipay.

Step 102. Determine a target light spot based on a target parameter of the application scenario, where target light spots corresponding to different target parameters have different proportions for a red light component, a green light component, and a blue light component, and the red light component, the green light component, and the blue light component are a brightness value of red light, a brightness value of blue light, and a brightness value of green light, respectively.

In this embodiment of this application, a target parameter of the application scenario is a characteristic parameter corresponding to the application scenario, for example, an occurrence frequency of the application scenario or a required security level of the application scenario. In other words, the target parameter is determined based on the required security level of the application scenario and/or the occurrence frequency of the application scenario. The required security level of the application scenario is determined by the risks and losses that users will bear if the security environment is compromised.

Different fingerprint recognition application scenarios (that is, different fingerprint recognition scenarios) have different required security levels, and the occurrence frequencies of different application scenarios are also different. For example, in various application scenarios, the application scenario of unlocking the electronic device screen occurs more frequently, but the required security level is low; while the application scenario of paying or transferring money occurs less frequently than that of unlocking the screen, but the required security level is relatively high.

The optical fingerprint recognition technology relies on red light for anti-counterfeiting recognition. For an application scenario with a relatively high required security level, the red light contained in the fingerprint light spot can be set to a higher component to improve the anti-counterfeiting effect. For an application scenario with a high occurrence frequency, the blue light contained in the fingerprint light spot can be set to a relatively low component, to reduce depletion of organic light-emitting materials of the screen by the blue light, and decrease the screen brightness, thereby prolonging the screen service life. Specifically, the component herein refers to a brightness value corresponding to the light of a color, which is represented by any one of numerical values in 0, 1, 2, . . . , 255.

Optionally, the determining the target parameter based on the required security level of the application scenario and/or the occurrence frequency of the application scenario includes the following step A3 and step A4.

Step A3. Determine a target category of the application scenario based on the required security level of the application scenario and/or the occurrence frequency of the application scenario.

In this embodiment of this application, the target parameter includes a required security level of the application scenario and/or an occurrence frequency of the application scenario. Generally, different application scenarios of fingerprint recognition have different required security levels, and the occurrence frequencies of different application scenarios are also different. All possible application scenarios of fingerprint recognition related to the electronic device may be listed in advance, and the application scenarios may be classified according to the required security levels of the application scenarios and the occurrence frequencies of the application scenarios, and ranked and combined according to ratings of the required security levels and ratings of the occurrence frequencies, to determine the categories of the application scenarios. For example, the required security levels of the application scenarios are ranked from high to low as level 1, level 2, level 3, and level 4; and the occurrence frequencies of application scenarios are ranked from high to low as level 1, level 2, level 3, and level 4. According to an actual application, the application scenarios can be classified into four categories. A category 1 scenario is a scenario with required security level 4 and occurrence frequency level 1, meaning that the required security level is not high but the user uses fingerprint recognition most frequently, for example, a scenario of screen unlock. A category 2 scenario is a scenario with required security level 3 and occurrence frequency level 3, meaning that the required security level is average, and if the security is breached, users are exposed to low risks, and generally suffer no economic loss, but the frequency of use is less than that of screen unlock, for example, a scenario of identity authentication upon software or website login. A category 3 scenario is a scenario with required security level 2 and occurrence frequency level 4, meaning that the required security level is relatively high, and once the security is breached, users are exposed to relatively high risks, but the frequency of use is relatively low, for example, a scenario of identity authentication upon private file encryption and decryption. A category 4 scenario is a scenario with required security level 1 and occurrence frequency level 2, meaning that the required security level is extremely high, and once the security is breached, users are exposed to great risks and even suffer economic losses, and the frequency of use is also relatively high, for example, a scenario of terminal payment, bank transfer, or the like.

A target category corresponding to the current application scenario can be determined from the above classification based on the required security level and occurrence frequency of the current application scenario.

Certainly, more application scenarios may further be obtained according to a combination of the occurrence frequency and the required security, and target categories corresponding to the application scenarios can be set.

Certainly, according to an actual application, the target category may also be determined solely based on the required security level of the application scenario; or the target category may be determined solely based on the occurrence frequency of the application scenario. No detailed examples are given herein.

Step A4. Determine the target parameter of the application scenario based on the target category of the application scenario.

In this embodiment of this application, the target parameter of the application scenario may be determined based on the foregoing target category. For example, if the target category of the application scenario is category 1, the target parameter is determined to be a first parameter; if the target category is category 2, the target parameter is determined to be a second parameter; if the target category is category 3, the target parameter is determined to be a third parameter; and if the target category is category 4, the target parameter is determined to be a fourth parameter.

A target light spot may be designed for each target parameter in advance, and for the target light spot, a proportion of the red light component can be set according to the required security level of the application scenario, and a proportion of the blue light component can be set according to the occurrence frequency of the application scenario. A mapping between the target parameter and the target light spot in each application scenario is recorded. With a target light spot designed in advance, a corresponding target light spot can be directly determined after the target parameter is determined, which is faster and more efficient.

Certainly, there is no need to design a target light spot for each target parameter in advance. After the target parameter of the application scenario is determined, a target light spot can be directly designed in real time based on the specific target parameter and displayed. In this way, compared with designing a target light spot in advance, a more specific target light spot in higher compliance with a current requirement can be designed according to the current target parameter.

Step 103. Display a fingerprint icon formed by the target light spot.

In this embodiment of this application, after the target light spot is determined, the organic light-emitting diode in the fingerprint icon region under the screen emits the light that can form a fingerprint icon pattern, and the light has the same proportions of the red light component, the green light component, and the blue light component as the target light spot, and then the fingerprint icon formed by the target light spot can be displayed in the fingerprint icon region on the screen.

Figure 2:
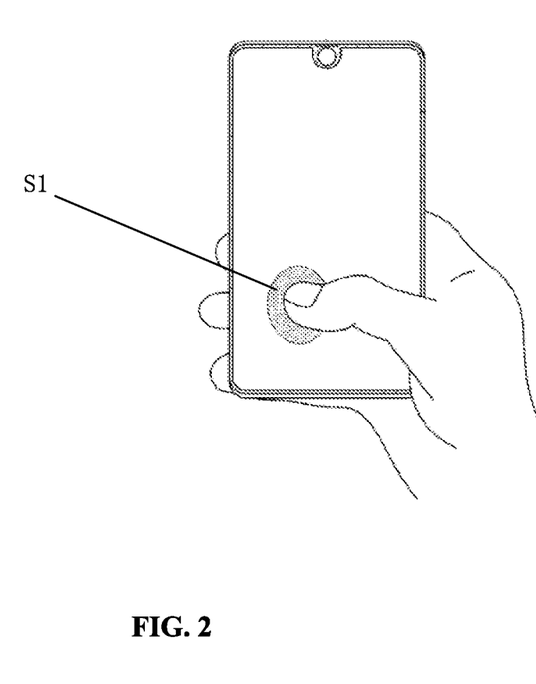
FIG. 2 is a schematic diagram of displaying a fingerprint icon formed by a target light spot according to an embodiment of this application.

FIG. 2 is a schematic diagram of displaying a fingerprint icon formed by a target light spot according to an embodiment of this application. In FIG. 2, a user presses the fingerprint icon region of the screen with a finger, and after determining a target light spot according to an application scenario, the electronic device displays a fingerprint icon Si formed by the target light spot in the fingerprint icon region.

After the fingerprint icon formed by the fingerprint light spot is displayed, the user's fingerprint can be recognized by using the fingerprint icon. Specifically, the organic light emitting diode in the OLED screen of the electronic device emits the light that can form a fingerprint icon pattern, and the light has the same proportions of the red light component, the green light component, and the blue light component as the target light spot. The blue light, red light, and green light in the light are synthesized to light up the screen to HBM. The red light in the light passes through the skin of the user's finger, and differences in blood flow formed in the vasodilation process of blood vessels in the finger result in changes in the reflected energy of the red light, and the changing reflected energy (for example, reflected light) is received by using an optical fingerprint sensor built in the electronic device. Because the reflected energy of a non-living finger to the red light is fixed, the red light can be used to distinguish a user's real fingerprint from a non-living fingerprint, so as to achieve the purpose of anti-counterfeiting.

Certainly, recognizing a non-living fingerprint is only the first step in fingerprint recognition. If a non-living fingerprint is recognized, a recognition failure prompt is displayed; and if a living fingerprint is recognized, the optical fingerprint sensor forms the user's fingerprint image on a sensor chip by utilizing an imaging function of the green light. The system matches the user's fingerprint image with a fingerprint image pre-stored in the electronic device. If the match is successful, the recognition is successful; and if the matching is unsuccessful, the recognition fails.

In conclusion, in this embodiment of this application, a current application scenario is determined in a case that an input of triggering display of a fingerprint icon is received; a target light spot is determined based on a target parameter of the application scenario, where target light spots corresponding to different target parameters have different proportions for a red light component for a green light component, and a blue light component, and the red light component, the green light component, and the blue light component are a brightness value of red light, a brightness value of blue light, and a brightness value of green light, respectively; and a fingerprint icon formed by the target light spot is displayed. In the method, target light spots corresponding to different target parameters have different proportions for a red light component, a green light component, and a blue light component, so that different target light spots have different fingerprint recognition rates, and deplete organic materials in the screen to different extents. A target light spot with the most suitable red light component, green light component and blue light component is selected based on a target parameter of the application scenario, such that the target light spot meets different requirements of different application scenarios for the fingerprint recognition rate and the degree of impact on the screen service life, thereby prolonging the screen service life and increasing the fingerprint recognition rate of the fingerprint icon.

Figure 3:
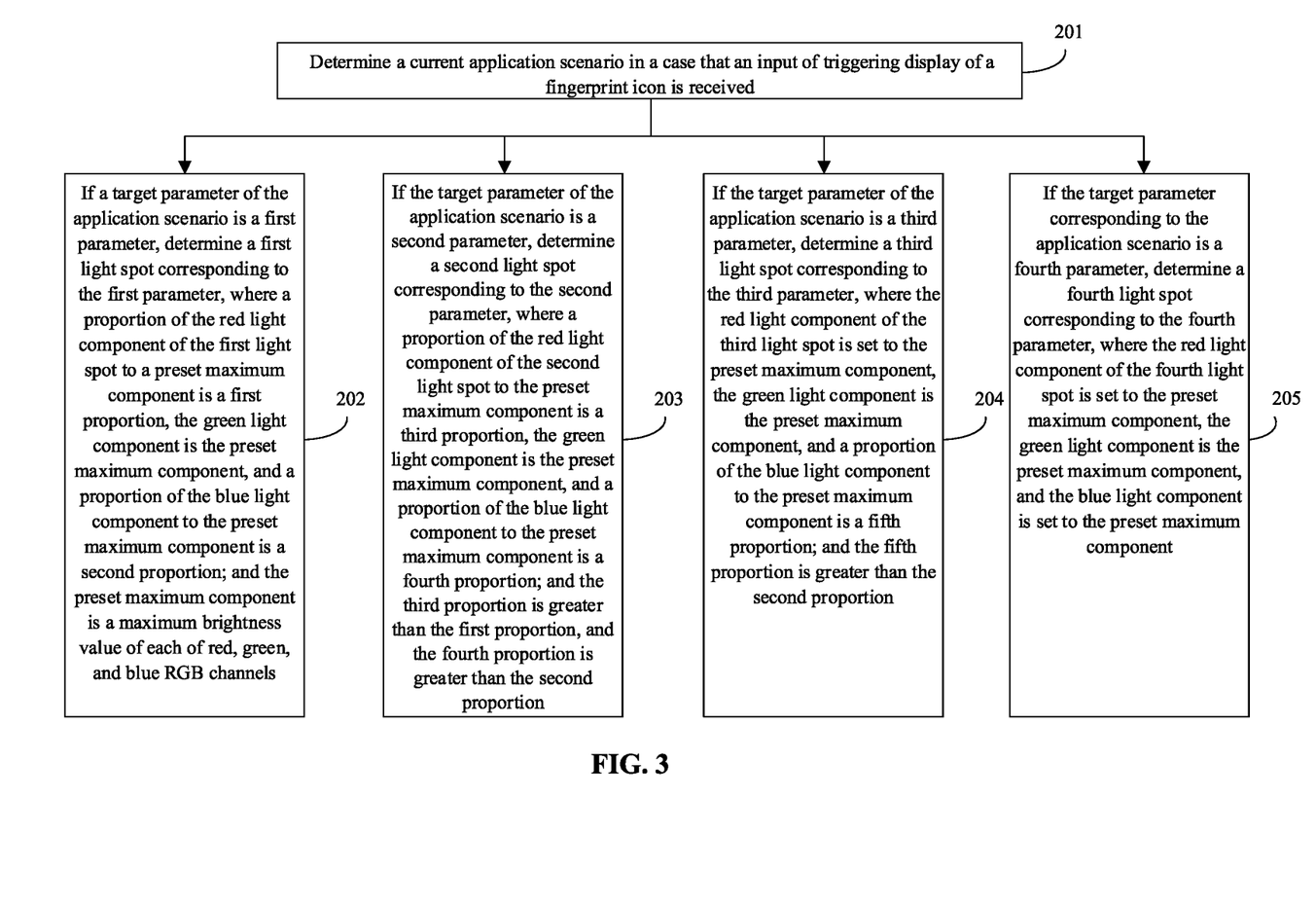
FIG. 3 is a second flowchart of a display method according to an embodiment of this application.

FIG. 3 is a second flowchart of a display method according to an embodiment of this application. The method is applied to an electronic device, and specifically may include the following steps.

Step 201. Determine a current application scenario in a case that an input of triggering display of a fingerprint icon is received.

In this embodiment of this application, for step 201, reference may be made to step 101, and details are not described herein again.

Step 202. If a target parameter of the application scenario is a first parameter, determine a first light spot corresponding to the first parameter, where a proportion of a red light component of the first light spot to a preset maximum component is a first proportion, a green light component thereof is the preset maximum component, and a proportion of a blue light component thereof to the preset maximum component is a second proportion; and the preset maximum component is a maximum brightness value of each of red, green, and blue RGB channels.

As we know, RGB color mode is a color standard in the industry, and various colors can be obtained by changing the three color channels of R (Red), G (Green), and B (Blue) and superimposing them with each other. RGB is the color representing the three channels of red, green, and blue. The light emitted by an organic light-emitting diode is also composed of red light, green light, and blue light in different proportions. Specifically, RGB each have 256 levels of brightness, represented by numbers from 0, 1, 2, . . . to 255. The preset maximum component is a maximum brightness value of each of the RGB channels, which means that the preset maximum component is 255.

A target light spot may be designed for an application scenario corresponding to each target parameter. For the target light spot, a proportion of the red light component is set based on a required security level of the application scenario, and a proportion of the blue light component is set based on an occurrence frequency of the application scenario. In this way, the target light spot with appropriate proportions of the red light component, the green light component, and the blue light component may be determined based on the target parameter of the current application scenario. Specifically, the red light component, the green light component, and the blue light component herein are a brightness value of red light, a brightness value of blue light, and a brightness value of green light, respectively, and each of them is represented by any one of numerical values in 0, 1, 2, . . . , 255.

In this embodiment of this application, if the target parameter corresponding to the current application scenario is determined to be a first parameter, a first light spot suitable for the first parameter may be determined as the target light spot corresponding to the application scenario.

If the first parameter corresponds to a scenario with required security level 4 and occurrence frequency level 1, the required security level is not high but the user uses fingerprint recognition most frequently, for example, a scenario of screen unlock. Preferably, it may be determined that: the first proportion is 70%, meaning that a proportion of the red light component to the preset maximum component is 70%; and the second proportion is 50%, meaning that a proportion of the blue light component to the preset maximum component is 50%. Because the green light component is used for imaging and has little impact on depletion of organic light-emitting materials, and the green light helps to improve accuracy of fingerprint recognition, the green light component may be the preset maximum component. Specifically, the preset maximum component is 255, the red light component to the preset maximum component is 70%, which means that the red light component is 255×70%=179, and the proportion of the blue light component to the preset maximum component is 50%, which means that the blue light component is 255×50%=128. Therefore, an RGB value of the first light spot is 179:255:128.

Step 203. If the target parameter of the application scenario is a second parameter, determine a second light spot corresponding to the second parameter, where a proportion of a red light component of the second light spot to the preset maximum component is a third proportion, a green light component thereof is the preset maximum component, and a proportion of a blue light component thereof to the preset maximum component is a fourth proportion, where the third proportion is greater than the first proportion, and the fourth proportion is greater than the second proportion.

In this embodiment of this application, if the target parameter corresponding to the current application scenario is determined to be the second parameter, a second light spot that matches the second parameter may be determined as the target light spot corresponding to the application scenario.

If the second parameter corresponds to a scenario with required security level 3 and occurrence frequency level 3, the required security level is average, and if the security is breached, the user is exposed to low risks and generally suffers no economic loss, but the frequency of use is less than that of screen unlock, for example, a scenario of identity authentication upon software or website login. Because the second parameter corresponds to a required security level higher than that of the first parameter, the proportion of the red light component in the second light spot may be increased to improve the anti-counterfeiting recognition capability. Because the frequency of use of the second parameter is lower than that of the first parameter, properly increasing the proportion of the blue light component does not increase depletion of the screen, but helps to increase the brightness of the screen in HBM.

Therefore, the third proportion may be set greater than the first proportion, and the fourth proportion greater than the second proportion. For example, the third proportion is set to 80%, meaning that the proportion of the red light component to the preset maximum component is 80%, and the fourth proportion is set to 80%, meaning that the proportion of the blue light component to the preset maximum component is 80%. Specifically, the proportion of the red light component to the preset maximum component is 80%, which means that the red light component is 255×80%=204, and the proportion of the blue light component to the preset maximum component is 80%, which means that the blue light component is 255×80%=204. Therefore, an RGB value of the second light spot is 204:255:204.

Step 204. If the target parameter of the application scenario is a third parameter, determine a third light spot corresponding to the third parameter, where a red light component of the third light spot is the preset maximum component, a green light component thereof is the preset maximum component, and a proportion of a blue light component thereof to the preset maximum component is a fifth proportion, where the fifth proportion is greater than the second proportion.

In this embodiment of this application, if the target parameter corresponding to the current application scenario is determined to be the third parameter, the third light spot suitable for the third parameter may be determined as the target light spot corresponding to the application scenario.

If the third parameter corresponds to a scenario with required security level 2 and occurrence frequency level 4, the required security level is relatively high, and once the security is breached, the user is exposed to high risks, but the frequency of use is low, for example, a scenario of identity authentication upon private file encryption and decryption. Because the third parameter corresponds to a high required security level, a proportion of the red light component in the third light spot may be set to the highest value to improve the anti-counterfeiting recognition capability. Because the third parameter corresponds to a frequency of use lower than the first parameter, properly increasing the proportion of the blue light component does not increase depletion of the screen, but helps to increase the brightness of the screen in HBM. Therefore, the fifth proportion of the blue light component is greater than the second proportion. Specifically, the fifth proportion may be set equal to the fourth proportion, meaning that an optimal proportion of the blue light component to the preset maximum component is 80%. In conclusion, the red light component is the preset maximum component, which is 255, and the proportion of the blue light component to the preset maximum component is 80%, which means that the blue light component is 255×80%=204. Therefore, an RGB value of the second light spot is 255:255:204.

Step 205. If the target parameter corresponding to the application scenario is a fourth parameter, determine a fourth light spot corresponding to the fourth parameter, where a red light component of the fourth light spot is the preset maximum component, a green light component thereof is the preset maximum component, and a blue light component thereof is the preset maximum component.

In this embodiment of this application, if the target parameter corresponding to the current application scenario is determined to be the fourth parameter, the fourth light spot suitable for the fourth parameter may be determined as the target light spot corresponding to the application scenario.

The fourth parameter may correspond to a scenario with required security level 1 and occurrence frequency level 2, meaning that the required security level is extremely high, and once the security is breached, the user is exposed to great risks and even suffers economic losses, and the frequency of use is also relatively high, for example, a scenario of terminal payment, bank transfer, or the like. Because the fourth parameter corresponds to an extremely high required security level, the proportion of the red light component in the fourth light spot can be set to the highest value to improve the anti-counterfeiting recognition capability. According to currently available data, the number of daily screen unlocks is about 10 times of the number of payment times, so it is the scenario of daily screen unlock that affects the screen service life, not the payment scenario. In consideration of the payment security and the accuracy of fingerprint recognition, the proportion of the blue light component may also be set to the highest value. Specifically, an RGB value of the fourth light spot is 255:255:255.

It can be understood that the first proportion, the second proportion, the third proportion, the fourth proportion, and the fifth proportion all have an optimal value, but in practical application, appropriate adjustment can be made on the basis of the optimal values.

Step 206. Display a fingerprint icon formed by the target light spot.

In this embodiment of this application, for step 206, reference may be made to step 103, and details are not described herein again.

In conclusion, in the display method provided in this embodiment of this application, in addition to the beneficial effects of the display method in FIG. 1, proportions of the red light component, the green light component, and the blue light component in the light spot corresponding to each target category are designed in detail according to the required security level and occurrence frequency of the scenario. Specifically, for a scenario with a relatively high required security level, the proportion of the red light component may be increased, and in a scenario with a relatively high occurrence frequency, the proportion of the blue light component may be decreased, such that the target light spot precisely matches the application scenario, thereby prolonging the screen service life and increasing the fingerprint recognition rate.

Figure 4:
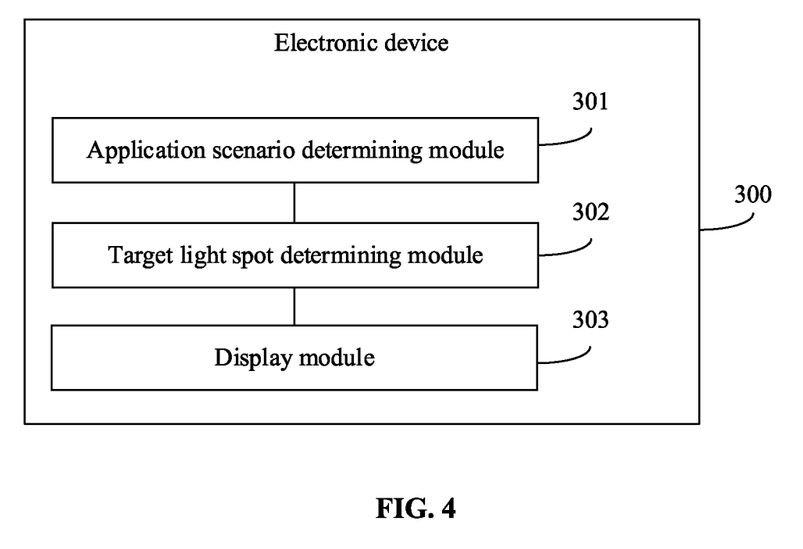
FIG. 4 is a first structural block diagram of an electronic device according to an embodiment of this application.

FIG. 4 is a first structural block diagram of an electronic device according to an embodiment of this application. The electronic device 300 may specifically include:

an application scenario determining module 301, configured to determine a current application scenario in a case that an input of triggering display of a fingerprint icon is received;

a target light spot determining module 302, configured to determine a target light spot based on a target parameter of the application scenario, where target light spots corresponding to different target parameters have different proportions for a red light component, a green light component, and a blue light component, and the red light component, the green light component, and the blue light component are a brightness value of red light, a brightness value of blue light, and a brightness value of green light, respectively; and a display module 303, configured to display a fingerprint icon formed by the target light spot.

The electronic device provided in this embodiment of this application is capable of implementing processes that are implemented in the method embodiment of FIG. 1. To avoid repetition, details are not described herein again.

In this way, the electronic device provided in this embodiment of this application determines a current application scenario in a case that an input of triggering display of a fingerprint icon is received; determines a target light spot based on a target parameter of the application scenario, where target light spots corresponding to different target parameters have different proportions for a red light component, a green light component, and a blue light component; and displays a fingerprint icon formed by the target light spot. In the electronic device, target light spots corresponding to different target parameters have a red light component, a green light component, and a blue light component that may be different from one another, or correspond to different brightness values of the red light, brightness values of the blue light, and brightness values of the green light, so that different target light spots have different fingerprint recognition rates, and deplete organic materials in the screen to different extents. A target light spot with the most suitable red light component, green light component and blue light component is selected based on a target parameter of the application scenario, such that the target light spot meets different requirements of different application scenarios for the fingerprint recognition rate and the degree of impact on the screen service life, thereby prolonging the screen service life and increasing the fingerprint recognition rate of the fingerprint icon.

Figure 5:
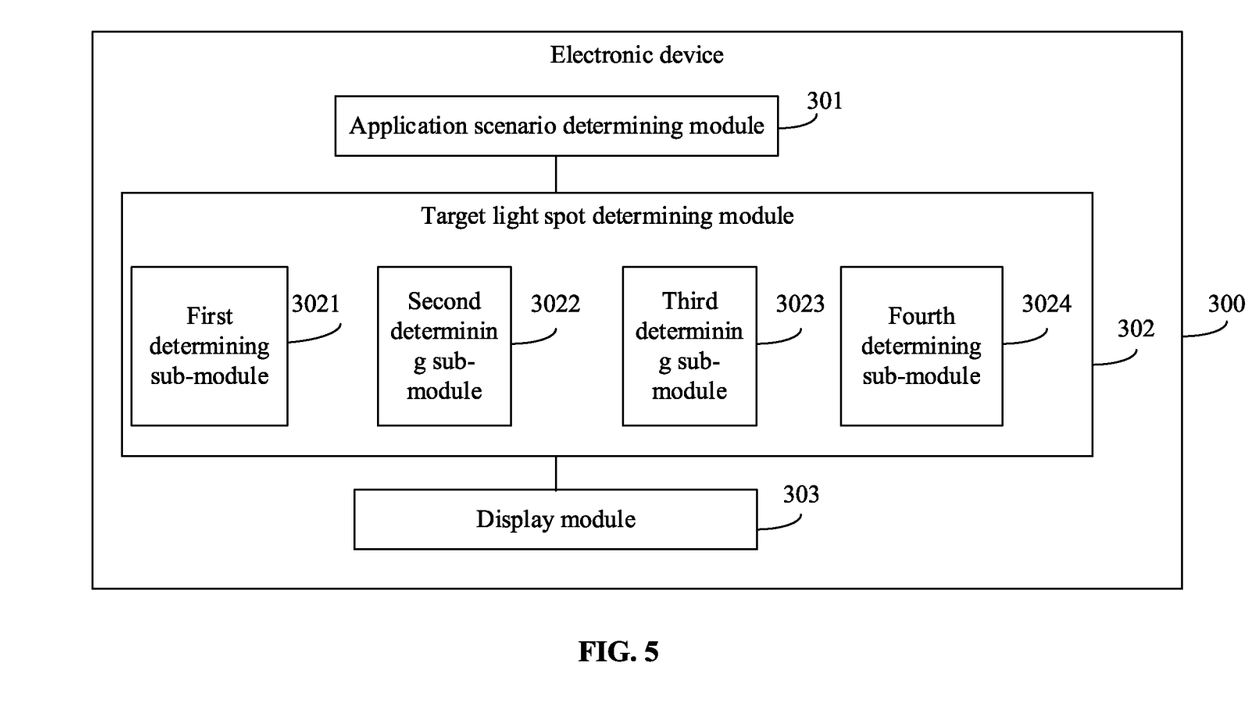
FIG. 5 is a second structural block diagram of an electronic device according to an embodiment of this application.

On the basis of FIG. 4, FIG. 5 is a second schematic structural diagram of an electronic device according to an embodiment of this application. If the target parameter of the application scenario is a first parameter, the target light spot determining module 302 includes:

a first determining sub-module 3021, configured to determine a first light spot corresponding to the first parameter, where a proportion of a red light component of the first light spot to a preset maximum component is a first proportion, a green light component thereof is the preset maximum component, and a proportion of a blue light component thereof to the preset maximum component is a second proportion; and the preset maximum component is a maximum brightness value of each of red, green, and blue RGB channels.

If the target parameter of the application scenario is a second parameter, the target light spot determining module 302 includes:

a second determining sub-module 3022, configured to determine a second light spot corresponding to the second parameter, where a proportion of a red light component of the second light spot to the preset maximum component is a third proportion, a green light component thereof is the preset maximum component, and a proportion of a blue light component thereof to the preset maximum component is a fourth proportion, where the third proportion is greater than the first proportion, and the fourth proportion is greater than the second proportion.

If the target parameter of the application scenario is a third parameter, the target light spot determining module 302 includes:

a third determining sub-module 3023, configured to determine a third light spot corresponding to the third parameter, where a red light component of the third light spot is the preset maximum component, a green light component thereof is the preset maximum component, and a proportion of a blue light component thereof to the preset maximum component is a fifth proportion, where the fifth proportion is greater than the second proportion.

If the target parameter corresponding to the application scenario is a fourth parameter, the target light spot determining module 302 includes:

a fourth determining sub-module 3024, configured to determine a fourth light spot corresponding to the fourth parameter, where a red light component of the fourth light spot is the preset maximum component, a green light component thereof is the preset maximum component, and a blue light component thereof is the preset maximum component.

The electronic device provided in this embodiment of this application is capable of implementing processes that are implemented in the method embodiment of FIG. 3. To avoid repetition, details are not described herein again.

In the electronic device in this embodiment of this application, in addition to the beneficial effects of the electronic device in FIG. 4, proportions of the red light component, the green light component, and the blue light component in the light spot corresponding to each target category are designed in detail based on the required security level and occurrence frequency of the scenario. Specifically, for scenario with a relatively high required security level, the proportion of the red light component may be increased, and in a scenario with a relatively high occurrence frequency, the proportion of the blue light component may be decreased, so that the target light spot precisely matches the application scenario, further prolonging the screen service life and increasing the fingerprint recognition rate.

Figure 6:
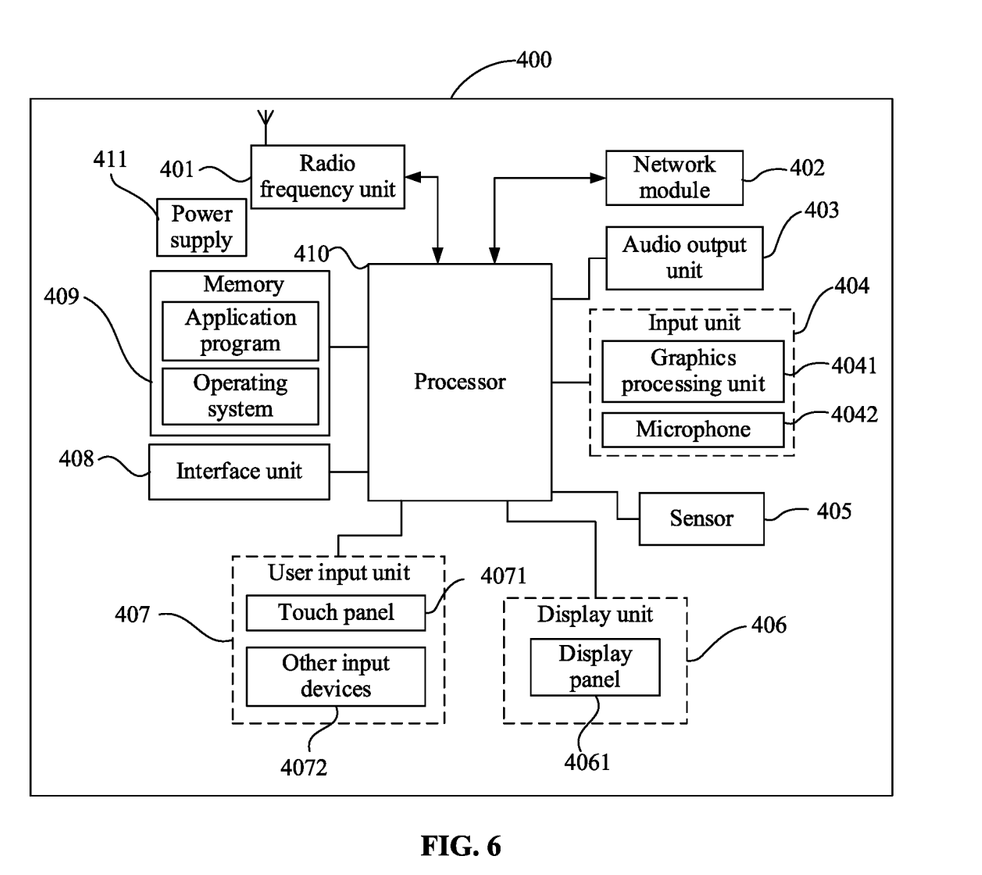
FIG. 6 is a schematic diagram of a hardware structure of a mobile terminal for implementing the embodiments of this application.

FIG. 6 is a schematic diagram of a hardware structure of a mobile terminal for implementing the embodiments of this application.

The mobile terminal 400 includes but is not limited to components such as a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art may understand that the mobile terminal structure shown in FIG. 6 does not constitute a limitation on the mobile terminal. The mobile terminal may include more or fewer components than those shown in the figure, or some components may be combined, or there may be a different component layout. In an embodiment of this application, the mobile terminal includes but is not limited to a mobile phone, a tablet computer, a notebook computer, a palmtop computer, an in-vehicle terminal, a wearable device, a pedometer, and the like.

The processor 410 is configured to:
  determine an application scenario corresponding to the target fingerprint in a case that an input of triggering display of a fingerprint icon is received;
  determine a target light spot from a plurality of preset candidate light spots based on a target parameter of the application scenario, where the plurality of candidate light spots have different proportions for the red light component, the green light component, and the blue light component respectively;
  control the display unit 406 to display in a fingerprint icon region a fingerprint icon formed by the target light spot; and
  use the fingerprint icon to recognize the target fingerprint.

In this embodiment of this application, a current application scenario is determined in a case that an input of triggering display of a fingerprint icon is received; a target light spot is determined based on a target parameter of the application scenario, where target light spots corresponding to different target parameters have different proportions for a red light component, a green light component, and a blue light component; and a fingerprint icon formed by the target light spot is displayed. In the method, target light spots corresponding to different target parameters have different proportions for a red light component, a green light component, and a blue light component, so that different target light spots have different fingerprint recognition rates, and deplete organic materials in the screen to different extents. A target light spot with the most suitable red light component, green light component and blue light component is selected based on a target parameter of the application scenario, such that the target light spot meets different requirements of different application scenarios for the fingerprint recognition rate and the degree of impact on the screen service life, thereby prolonging the screen service life and increasing the fingerprint recognition rate of the fingerprint icon.

It should be understood that, in this embodiment of this application, the radio frequency unit 401 may be configured to transmit or receive a signal in an information transmitting/receiving or call process. Specifically, the radio frequency unit 401 receives downlink data from a base station and transmits the downlink data to the processor 410 for processing; and transmits uplink data to the base station. Typically, the radio frequency unit 401 includes but is not limited to an antenna, at least one amplifier, a transceiver, a coupler, a low noise amplifier, a duplexer, and the like. In addition, the radio frequency unit 401 may also communicate with a network and other devices via a wireless communications system.

The mobile terminal provides a user with wireless broadband internet access through the network module 402, for example, helping the user to send or receive an e-mail, to browse a web page, or to access streaming media.

The audio output unit 403 may convert audio data received by the radio frequency unit 401 or the network module 402 or stored in the memory 409 into an audio signal, and output the audio signal as a sound. Furthermore, the audio output unit 403 may also provide audio output (for example, a call signal received sound or a message received sound) related to a specific function performed by the mobile terminal 400. The audio output unit 403 includes a speaker, a buzzer, a receiver, and the like.

The input unit 404 is configured to receive an audio or video signal. The input unit 404 may include a graphics processing unit (GPU) 4041 and a microphone 4042. The graphics processing unit 4041 processes image data of a static picture or a video obtained by an image capture apparatus (for example, a camera) in an image capture mode or a video capture mode. A processed image frame may be displayed on the display unit 406. An image frame processed by the graphics processing unit 4041 may be stored in the memory 409 (or another storage medium) or transmitted by the radio frequency unit 401 or the network module 402. The microphone 4042 may receive a sound, and can process the sound into audio data. The processed audio data can be converted in a telephone call mode into a format that can be transmitted to a mobile communication base station through the radio frequency unit 401, for outputting.

The mobile terminal 400 further includes at least one sensor 405, such as an optical sensor, a motion sensor, and other sensors. Specifically, the optical sensor includes an ambient light sensor and a proximity sensor. The ambient light sensor may adjust luminance of the display panel 4061 based on brightness of ambient light, and the proximity sensor may turn off the display panel 4061 or backlight when the mobile terminal 400 moves close to an ear. As a type of motion sensor, an accelerometer sensor can detect magnitudes of accelerations in all directions (typically three axes), can detect a magnitude and a direction of gravity when being static, and can be applied to mobile terminal posture recognition (such as screen switching between portrait and landscape, related games, and magnetometer posture calibration), functions related to vibration recognition (such as a pedometer and tapping), and the like. The sensor 405 may also include a fingerprint sensor, a pressure sensor, an iris sensor, a molecular sensor, a gyroscope, a barometer, a hygrometer, a thermometer, an infrared sensor, and the like. Details are not described herein.

The display unit 406 is configured to display information input by the user or information provided for the user. The display unit 406 may include the display panel 4061, and the display panel 4061 may be configured in a form of a liquid crystal display (LCD), an organic light-emitting diode (OLED), or the like.

The user input unit 407 may be configured to receive input digit or character information and generate key signal input related to user setting and function control of the mobile terminal. Specifically, the user input unit 407 includes a touch panel 4071 and other input devices 4072. The touch panel 4071 is also referred to as a touchscreen, and may collect a touch operation of the user on or near the touch panel 4071 (for example, an operation performed on or near the touch panel 4071 by the user by using any appropriate object or accessory such as a finger or a stylus). The touch panel 4071 may include two parts: a touch detection apparatus and a touch controller. The touch detection apparatus detects a touch location by the user, detects a signal brought by the touch operation, and transmits the signal to the touch controller. The touch controller receives touch information from the touch detection apparatus, converts the touch information into point coordinates, transmits the point coordinates to the processor 410, receives a command transmitted by the processor 410, and executes the command. In addition, the touch panel 4071 may be implemented in a plurality of forms, for example, as a resistive, capacitive, infrared, or surface acoustic wave touch panel. The user input unit 407 may further include other input devices 4072 in addition to the touch panel 4071. Specifically, the other input devices 4072 may include but are not limited to a physical keyboard, a function key (for example, a volume control key or a power on/off key), a track ball, a mouse, and a joystick. Details are not described herein.

Further, the touch panel 4071 may cover the display panel 4061. After detecting a touch operation on or near the touch panel 4071, the touch panel 4071 transmits the touch operation to the processor 410 to determine a type of a touch event. Then the processor 410 provides corresponding visual output on the display panel 4061 based on the type of the touch event. Although in FIG. 6, the touch panel 4071 and the display panel 4061 act as two separate parts to implement input and output functions of the mobile terminal, in some embodiments, the touch panel 4071 and the display panel 4061 may be integrated to implement the input and output functions of the mobile terminal. This is not specifically limited herein.

The interface unit 408 is an interface connecting an external apparatus to the mobile terminal 400. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 408 may be configured to: receive input (for example, data information and power) from the external apparatus, and transmit the received input to one or more elements in the mobile terminal 400, or may be configured to transmit data between the mobile terminal 400 and the external apparatus.

The memory 409 may be configured to store a software program and various data. The memory 409 may mainly include a program storage area and a data storage area. The program storage area may store an operating system, an application program required by at least one function (for example, an audio play function or an image play function), and the like. The data storage area may store data (for example, audio data and a phone book) created based on usage of the mobile phone. In addition, the memory 409 may include a high-speed random access memory, and may further include a non-volatile memory such as a disk storage device, a flash memory device, or another volatile solid-state storage device.

The processor 410 is a control center of the mobile terminal, and is connected to all components of the mobile terminal by using various interfaces and lines. By running or executing a software program or module that is stored in the memory 409 and calling data stored in the memory 409, the processor 410 executes various functions of the mobile terminal and processes data, so as to perform overall monitoring on the mobile terminal. The processor 410 may include one or more processing units. Preferably, the processor 410 may integrate an application processor and a modem processor. The application processor mainly processes the operating system, a user interface, an application program, and the like. The modem processor mainly processes wireless communication. It can be understood that the modem processor may be alternatively not integrated in the processor 410.

The mobile terminal 400 may further include the power supply 411 (for example, a battery) supplying power to all components. Preferably, the power supply 411 may be logically connected to the processor 410 through a power management system. In this way, functions such as charge management, discharge management, and power consumption management are implemented by using the power management system.

In addition, the mobile terminal 400 includes some functional modules that are not shown, details of which are not described herein.

Preferably, an embodiment of this application further provides a mobile terminal, including: a processor 410, a memory 409, and a computer program that is stored in the memory 409 and capable of running on the processor 410. When the computer program is executed by the processor 410, the processes of the foregoing embodiments of the display method are implemented, with the same technical effects achieved. To avoid repetition, details are not described herein again.

Based on the hardware structure of the mobile terminal, the embodiments of this application are described below in detail.

An embodiment of this application further provides a computer-readable storage medium, where the computer-readable storage medium stores a computer program. When the computer program is executed by a processor, the processes of the foregoing embodiments of the display method are implemented, with the same technical effects achieved. To avoid repetition, details are not described herein again. For example, the computer-readable storage medium is, for example, a read-only memory (ROM for short), a random access memory (RAM for short), a magnetic disk, or an optical disc.

An embodiment of this application further provides a display apparatus, where the display apparatus is configured to perform the steps of the display method embodiment.

It should be noted that the terms "comprise", "include", or any of their variants in this specification are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, however, the former is a more preferred implementation. Based on such an understanding, the technical solutions of this application essentially, or a part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific implementations. The foregoing specific implementations are merely illustrative rather than restrictive. In light of this application, a person of ordinary skill in the art may develop many other forms without departing from principles of this application and the protection scope of the claims, and all such forms shall fall within the protection scope of this application.

What is claimed is:

1. An electronic device, comprising a processor, a memory, and a computer program that is stored in the memory and capable of running on the processor, wherein the computer program, when being executed by the processor, implements the steps of:
    determining a current application scenario of fingerprint recognition in a case that an input of triggering display of a fingerprint icon is received;
    determining a target light spot based on a target parameter of the current application scenario, wherein the target parameter of the current application scenario is determined based on a required security level of the current application scenario and/or an occurrence frequency of the current application scenario, target light spots corresponding to different target parameters have different proportions for a red light component, a green light component and a blue light component, and the red light component, the green light component, and the blue light component are a brightness value of red light, a brightness value of blue light, and a brightness value of green light, respectively; and
    displaying a fingerprint icon formed by the target light spot.

2. The electronic device according to claim 1, wherein if the target parameter of the current application scenario is a first parameter, the determining a target light spot based on a target parameter of the current application scenario comprises:
    determining a first light spot corresponding to the first parameter, wherein a proportion of a red light component of the first light spot to a preset maximum component is a first proportion, a green light component thereof is the preset maximum component, and a proportion of a blue light component thereof to the preset maximum component is a second proportion; and the preset maximum component is a maximum brightness value of each of red, green, and blue (RGB) channels.

3. The electronic device according to claim 2, wherein if the target parameter of the current application scenario is a second parameter, the determining a target light spot based on a target parameter of the current application scenario comprises:
    determining a second light spot corresponding to the second parameter, wherein a proportion of a red light component of the second light spot to the preset maximum component is a third proportion, a green light component thereof is the preset maximum component, and a proportion of a blue light component thereof to the preset maximum component is a fourth proportion, wherein the third proportion is greater than the first proportion, and the fourth proportion is greater than the second proportion.

4. The electronic device according to claim 2, wherein if the target parameter of the current application scenario is a third parameter, the determining a target light spot based on a target parameter of the current application scenario comprises:
    determining a third light spot corresponding to the third parameter, wherein a red light component of the third light spot is the preset maximum component, a green light component thereof is the preset maximum component, and a proportion of a blue light component thereof to the preset maximum component is a fifth proportion, wherein the fifth proportion is greater than the second proportion.

5. The electronic device according to claim 2, wherein if the target parameter of the current application scenario is a fourth parameter, the determining a target light spot based on a target parameter of the current application scenario comprises:
    determining a fourth light spot corresponding to the fourth parameter, wherein a red light component of the fourth light spot is the preset maximum component, a green light component thereof is the preset maximum component, and a blue light component thereof is the preset maximum component.

6. A display method, applied to an electronic device, wherein the method comprises:
    determining a current application scenario of fingerprint recognition in a case that an input of triggering display of a fingerprint icon is received;
    determining a target light spot based on a target parameter of the current application scenario, wherein the target parameter of the current application scenario is determined based on a required security level of the current application scenario and/or an occurrence frequency of the current application scenario, target light spots corresponding to different target parameters have different proportions for a red light component, a green light component and a blue light component, and the red light component, the green light component, and the blue light component are a brightness value of red light, a brightness value of blue light, and a brightness value of green light, respectively; and
    displaying a fingerprint icon formed by the target light spot.

7. The method according to claim 6, wherein if the target parameter of the current application scenario is a first parameter, the determining a target light spot based on a target parameter of the current application scenario comprises:
    determining a first light spot corresponding to the first parameter, wherein a proportion of a red light component of the first light spot to a preset maximum component is a first proportion, a green light component thereof is the preset maximum component, and a proportion of a blue light component thereof to the preset maximum component is a second proportion; and the preset maximum component is a maximum brightness value of each of red, green, and blue (RGB) channels.

8. The method according to claim 7, wherein if the target parameter of the current application scenario is a second parameter, the determining a target light spot based on a target parameter of the current application scenario comprises:
    determining a second light spot corresponding to the second parameter, wherein a proportion of a red light component of the second light spot to the preset maximum component is a third proportion, a green light component thereof is the preset maximum component, and a proportion of a blue light component thereof to the preset maximum component is a fourth proportion, wherein the third proportion is greater than the first proportion, and the fourth proportion is greater than the second proportion.

9. The method according to claim 7, wherein if the target parameter of the current application scenario is a third parameter, the determining a target light spot based on a target parameter of the current application scenario comprises:

determining a third light spot corresponding to the third parameter, wherein a red light component of the third light spot is the preset maximum component, a green light component thereof is the preset maximum component, and a proportion of a blue light component thereof to the preset maximum component is a fifth proportion, wherein the fifth proportion is greater than the second proportion.

10. The method according to claim 7, wherein if the target parameter of the current application scenario is a fourth parameter, the determining a target light spot based on a target parameter of the current application scenario comprises:

determining a fourth light spot corresponding to the fourth parameter, wherein a red light component of the fourth light spot is the preset maximum component, a green light component thereof is the preset maximum component, and a blue light component thereof is the preset maximum component.

11. A non-transitory computer-readable storage medium, wherein the computer-readable storage medium stores a computer program, and the computer program, when being executed by a processor, implements the steps of the display method according to claim 6.

12. The storage medium according to claim 11, wherein if the target parameter of the current application scenario is a first parameter, the determining a target light spot based on a target parameter of the current application scenario comprises:

determining a first light spot corresponding to the first parameter, wherein a proportion of a red light component of the first light spot to a preset maximum component is a first proportion, a green light component thereof is the preset maximum component, and a proportion of a blue light component thereof to the preset maximum component is a second proportion; and the preset maximum component is a maximum brightness value of each of red, green, and blue (RGB) channels.

13. The storage medium according to claim 12, wherein if the target parameter of the current application scenario is a second parameter, the determining a target light spot based on a target parameter of the current application scenario comprises:

determining a second light spot corresponding to the second parameter, wherein a proportion of a red light component of the second light spot to the preset maximum component is a third proportion, a green light component thereof is the preset maximum component, and a proportion of a blue light component thereof to the preset maximum component is a fourth proportion, wherein the third proportion is greater than the first proportion, and the fourth proportion is greater than the second proportion.

14. The storage medium according to claim 12, wherein if the target parameter of the current application scenario is a third parameter, the determining a target light spot based on a target parameter of the current application scenario comprises:

determining a third light spot corresponding to the third parameter, wherein a red light component of the third light spot is the preset maximum component, a green light component thereof is the preset maximum component, and a proportion of a blue light component thereof to the preset maximum component is a fifth proportion, wherein the fifth proportion is greater than the second proportion.

15. The storage medium according to claim 12, wherein if the target parameter of the current application scenario is a fourth parameter, the determining a target light spot based on a target parameter of the current application scenario comprises:

determining a fourth light spot corresponding to the fourth parameter, wherein a red light component of the fourth light spot is the preset maximum component, a green light component thereof is the preset maximum component, and a blue light component thereof is the preset maximum component.

16. A display apparatus, wherein the apparatus is configured to perform the display method according to claim 6.

17. The display apparatus according to claim 16, wherein if the target parameter of the current application scenario is a first parameter, the determining a target light spot based on a target parameter of the current application scenario comprises:

determining a first light spot corresponding to the first parameter, wherein a proportion of a red light component of the first light spot to a preset maximum component is a first proportion, a green light component thereof is the preset maximum component, and a proportion of a blue light component thereof to the preset maximum component is a second proportion; and the preset maximum component is a maximum brightness value of each of red, green, and blue (RGB) channels.

18. The display apparatus according to claim 17, wherein if the target parameter of the current application scenario is a second parameter, the determining a target light spot based on a target parameter of the current application scenario comprises:

determining a second light spot corresponding to the second parameter, wherein a proportion of a red light component of the second light spot to the preset maximum component is a third proportion, a green light component thereof is the preset maximum component, and a proportion of a blue light component thereof to the preset maximum component is a fourth proportion, wherein the third proportion is greater than the first proportion, and the fourth proportion is greater than the second proportion.

19. The display apparatus according to claim 17, wherein if the target parameter of the current application scenario is a third parameter, the determining a target light spot based on a target parameter of the current application scenario comprises:

determining a third light spot corresponding to the third parameter, wherein a red light component of the third light spot is the preset maximum component, a green light component thereof is the preset maximum component, and a proportion of a blue light component thereof to the preset maximum component is a fifth proportion, wherein the fifth proportion is greater than the second proportion.

20. The display apparatus according to claim 17, wherein if the target parameter of the current application scenario is a fourth parameter, the determining a target light spot based on a target parameter of the current application scenario comprises:

determining a fourth light spot corresponding to the fourth parameter, wherein a red light component of the fourth light spot is the preset maximum component, a green light component thereof is the preset maximum component, and a blue light component thereof is the preset maximum component.

* * * * *